United States Patent
Dellevigne et al.

(10) Patent No.: US 10,604,312 B2
(45) Date of Patent: Mar. 31, 2020

(54) CONTAINER CLOSURE WITH OVER-CAP DEVICE

(71) Applicant: PepsiCo, Inc., Purchase, NY (US)

(72) Inventors: Laura Dellevigne, Danbury, CT (US); Martin Antoine Mathelier, Garnerville, NY (US); Thierry Jean Robert Fabozzi, Geneva (CH); Shari Lee Morse, Temperance, MI (US)

(73) Assignee: PepsiCo, Inc., Purchase, NY (US)

( * ) Notice: Subject to any disclaimer, the term of this patent is extended or adjusted under 35 U.S.C. 154(b) by 206 days.

(21) Appl. No.: 15/272,091

(22) Filed: Sep. 21, 2016

(65) Prior Publication Data

US 2017/0081089 A1    Mar. 23, 2017

Related U.S. Application Data

(60) Provisional application No. 62/222,065, filed on Sep. 22, 2015.

(51) Int. Cl.
    *B65D 51/18*    (2006.01)

(52) U.S. Cl.
    CPC ...... *B65D 51/18* (2013.01); *B65D 2251/0015* (2013.01); *B65D 2251/0078* (2013.01)

(58) Field of Classification Search
    CPC .............. B65D 51/18; B65D 225/0015; B65D 2251/0078; B65D 2251/00781
    USPC ......................................... 215/228, 351, 220
    See application file for complete search history.

(56) References Cited

U.S. PATENT DOCUMENTS

| | | | |
|---|---|---|---|
| 3,315,830 A | 4/1967 | Flynn | |
| 3,878,961 A | 4/1975 | Curry et al. | |
| 4,150,761 A | 4/1979 | Collins | |
| 4,273,247 A * | 6/1981 | Earls | B65D 41/26 141/380 |
| 4,535,906 A | 8/1985 | Rowekamp | |
| 6,286,733 B1 | 9/2001 | Francois | |

FOREIGN PATENT DOCUMENTS

| | | |
|---|---|---|
| CN | 20159286 U | 9/2010 |
| EP | 0117722 A2 | 9/1984 |
| GB | 1203704 A | 9/1970 |
| KR | 2009008583 U | 8/2009 |

OTHER PUBLICATIONS

International Search Report and Written Opinion for International Application No. PCT/US2016/048654, dated Oct. 24, 2016, 9 pages.

* cited by examiner

*Primary Examiner* — Andrew T Kirsch
*Assistant Examiner* — Don M Anderson
(74) *Attorney, Agent, or Firm* — Sterne, Kessler, Goldstein & Fox P.L.L.C.

(57) ABSTRACT

An over-cap device for use with containers having caps. The over-cap device includes an outer wall, a cap engagement wall, and a spacing wall. The cap engagement wall may non-releasably engage an outer surface of the cap and the spacing wall may engage a top surface of the cap. The cap may releasably engage a container.

22 Claims, 7 Drawing Sheets

CONTAINER CLOSURE WITH OVER-CAP DEVICE

CROSS-REFERENCE TO RELATED APPLICATION

This application claims priority to U.S. Provisional Patent Application No. 62/222,065, filed on Sep. 22, 2015, which is incorporated herein in its entirety by reference thereto.

FIELD OF THE INVENTION

This invention relates generally to closures for containers, and more specifically to closures for beverage containers.

BACKGROUND

Many types of container closures exist for glass and plastic bottles. One type of bottle closure is a metal cap, which is crimped onto the top of a glass bottle and requires a bottle opener to remove it. Another type of bottle closure is a cap that screws onto the neck of a bottle. Generally, these bottle caps seal the opening of a bottle by coming into contact with the top of the bottle neck and covering the opening of the bottle. Some screw-on closures may also include a detachable tamper-evident ring. The above-mentioned bottle closures may be single use or reusable.

SUMMARY OF THE INVENTION

According to one aspect, a container and closure system are disclosed. According to another aspect, an over-cap device is disclosed.

According to another aspect a container and closure system is disclosed. The system may include an over-cap device including a top wall having an inner surface; an outer wall extending downward from the top wall; a cap engagement wall extending downward from the inner surface of the top wall; and a spacing wall extending downward from the inner surface of the top wall. The system may also include a cap, and a container, wherein the over-cap device is non-releasably engaged with the cap and wherein the cap is releasably engaged with container.

The cap engagement wall may be positioned inward and concentrically relative to the outer wall. The spacing wall may be positioned inward and concentrically relative to the cap engagement wall.

The container may include a container body and a container neck, and the outer wall of the over-cap device may engage the container body covering the neck. The container body may also include a recessed portion, wherein the outer wall is engaged with the recessed portion of the container body forming a substantially smooth transition between the outer wall and the container body.

The over-cap device and the cap may be non-releasably engaged with at least one of: press fitting, and snap fit mechanisms. The over-cap device and the cap may not be of unitary construction.

In another aspect an over-cap device is disclosed. The over-cap device may include a top wall having an inner surface; an outer wall extending downward from the top wall; a cap engagement wall extending downward from an inner surface of the top wall, the cap engagement wall being positioned inward and concentrically relative to the outer wall; a spacing wall extending downward from the inner surface of the top wall, the spacing wall being positioned inward and concentrically relative to the cap engagement wall. The over-cap device is configured to non-releasably engage a container cap with at least one of: press fitting, and snap fit mechanisms.

In another aspect, a container and closure system is disclosed. The container and closure system includes an over-cap device having a top wall having an inner surface; an outer wall extending downward from the top wall; a cap engagement wall extending downward from an inner surface of the top wall, the cap engagement wall being positioned inward and concentrically relative to the outer wall; and a spacing wall extending downward from the inner surface of the top wall, the spacing wall being positioned inward and concentrically relative to the cap engagement wall. The container and closure system also include a cap and a container comprising a container body and a container neck, wherein the outer wall engages the container body covering the neck. The over-cap device is non-releasably engaged with the cap and the cap is releasably engaged with container. The container body may include a recessed portion, and wherein the outer wall is engaged with the recessed portion of the container body forming a substantially smooth transition between the outer wall and the container body. The neck may define threads on the outer surface of the neck and wherein the cap defines corresponding threads on an inner surface of the cap. The over-cap device and the cap are non-releasably engaged with at least one of: press fitting, and snap fit mechanisms. The over-cap device and the cap are not of unitary construction.

This Summary is provided to introduce a selection of concepts in a simplified form that are further described below in the Detailed Description. The Summary is not intended to identify key features or essential features of the claimed subject matter, nor is it intended to be used to limit the scope of the claimed subject matter.

DETAILED DESCRIPTION

Figure 1A:
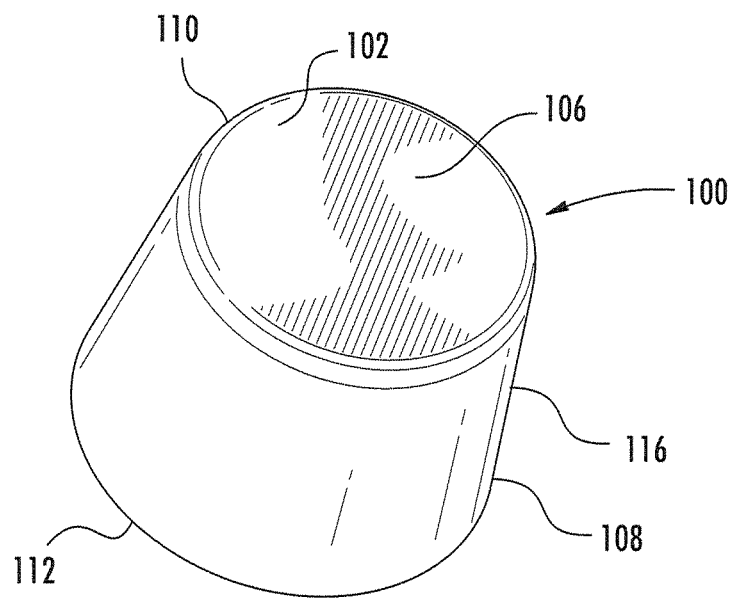
FIG. 1A is a top isometric view of an over-cap device according to according to aspects of the disclosure.

While this invention is susceptible of embodiments in many different forms, there are shown in the drawings and will herein be described in detail exemplary embodiments of the invention with the understanding that the present disclosure is to be considered as an exemplification of the principles of the invention and is not intended to limit the broad aspects of the invention to the embodiments illustrated. It is to be understood that other embodiments may be utilized, and structural and functional modifications may be made, without departing from the scope and spirit of the present disclosure.

In the following description of the various embodiments, reference is made to the accompanying drawings, which form a part hereof, and in which is shown by way of illustration, various embodiments of the disclosure that may be practiced. It is to be understood that other embodiments may be utilized.

In the following description of various example structures according to the invention, reference is made to the accompanying drawings, which form a part hereof, and in which are shown by way of illustration various example devices, systems, and environments in which aspects of the invention may be practiced. It is to be understood that other specific arrangements of parts, example devices, systems, and environments may be utilized and structural and functional modifications may be made without departing from the scope of the present invention. Also, while the terms "top," "bottom," "front," "back," "side," "rear," "upward," "downward," and the like may be used in this specification to describe various example features and elements of the invention, these terms are used herein as a matter of convenience, e.g., based on the example orientations shown in the figures or the orientation during typical use. Additionally, the term "plurality," as used herein, indicates any number greater than one, either disjunctively or conjunctively, as necessary, up to an infinite number. Nothing in this specification should be construed as requiring a specific three dimensional orientation of structures in order to fall within the scope of this invention. Also, the reader is advised that the attached drawings are not necessarily drawn to scale.

In general, aspects of this disclosure relate to container closure systems. According to various aspects and embodiments, the container closure system components may be formed of one or more of a variety of materials, such as glass, plastics, polymers, and composites, and may be formed in one of a variety of configurations, without departing from the scope of the invention.

The various figures in this application illustrate examples of container closure systems according to this disclosure. When the same reference number appears in more than one drawing, that reference number is used consistently in this specification and the drawings refer to the same or similar parts throughout.

Figure 1B:
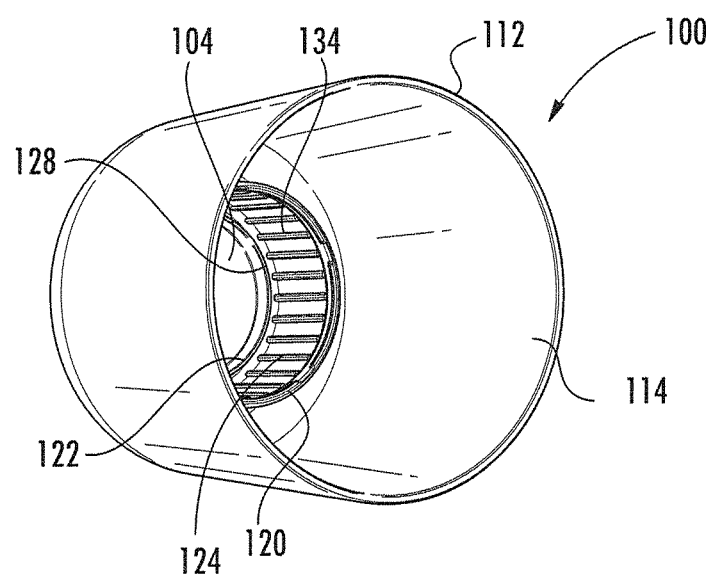
FIG. 1B is a bottom isometric view of the over-cap device of FIG. 1A.
Figure 2A:
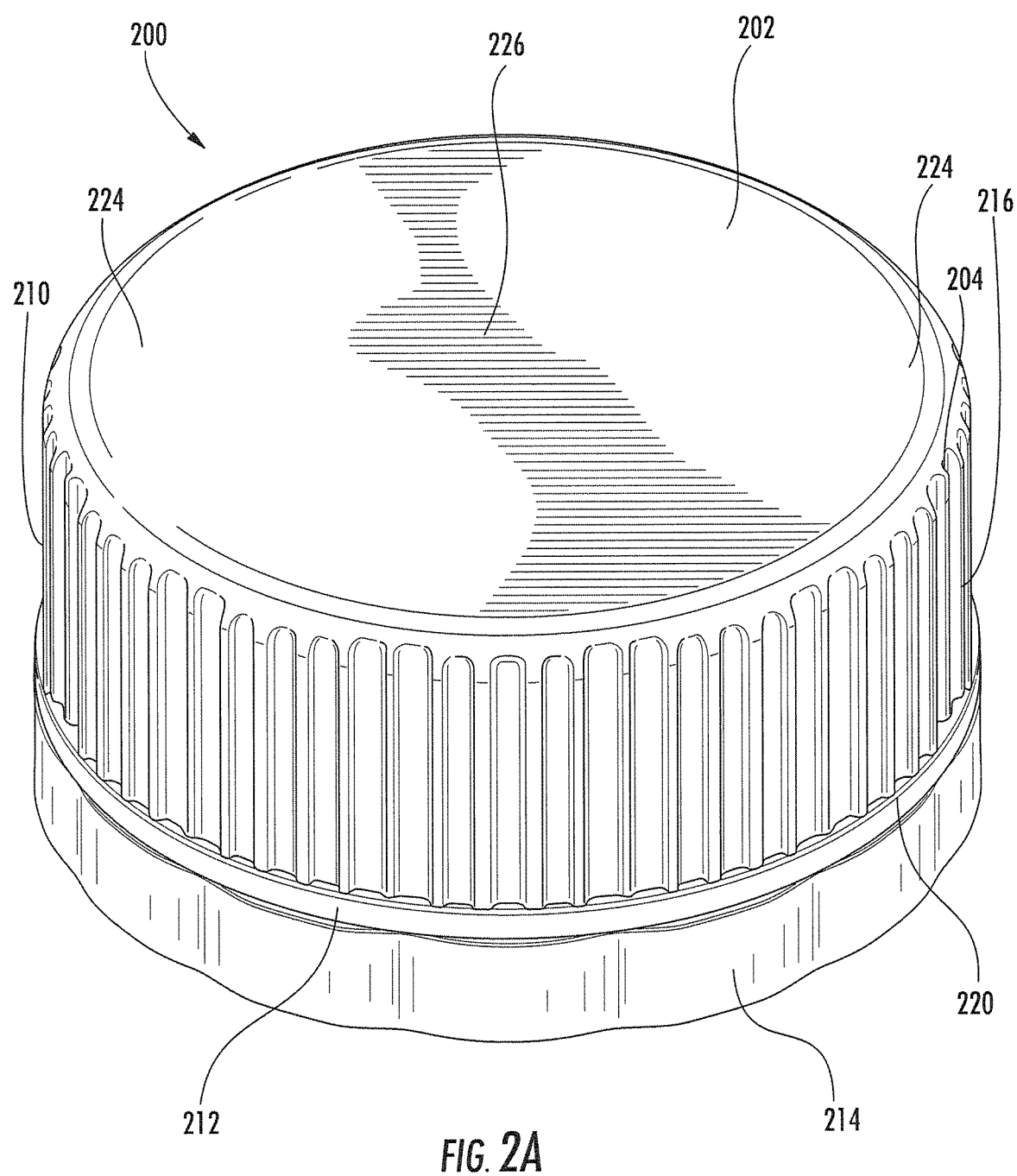
FIG. 2A is a top isometric view of a cap according to aspects of the disclosure.
Figure 2B:
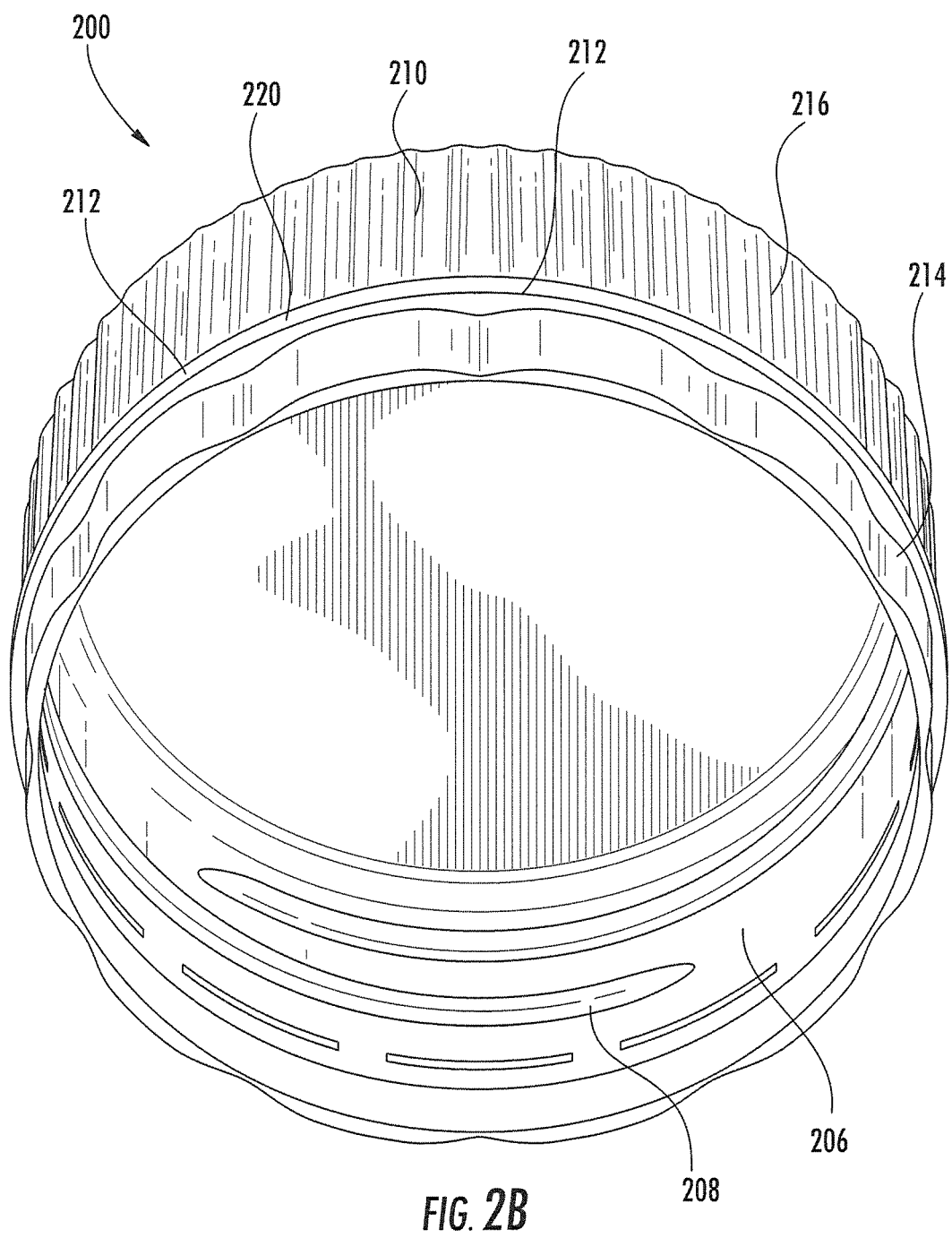
FIG. 2B is a bottom isometric view of the cap of FIG. 2A.
Figure 3A:
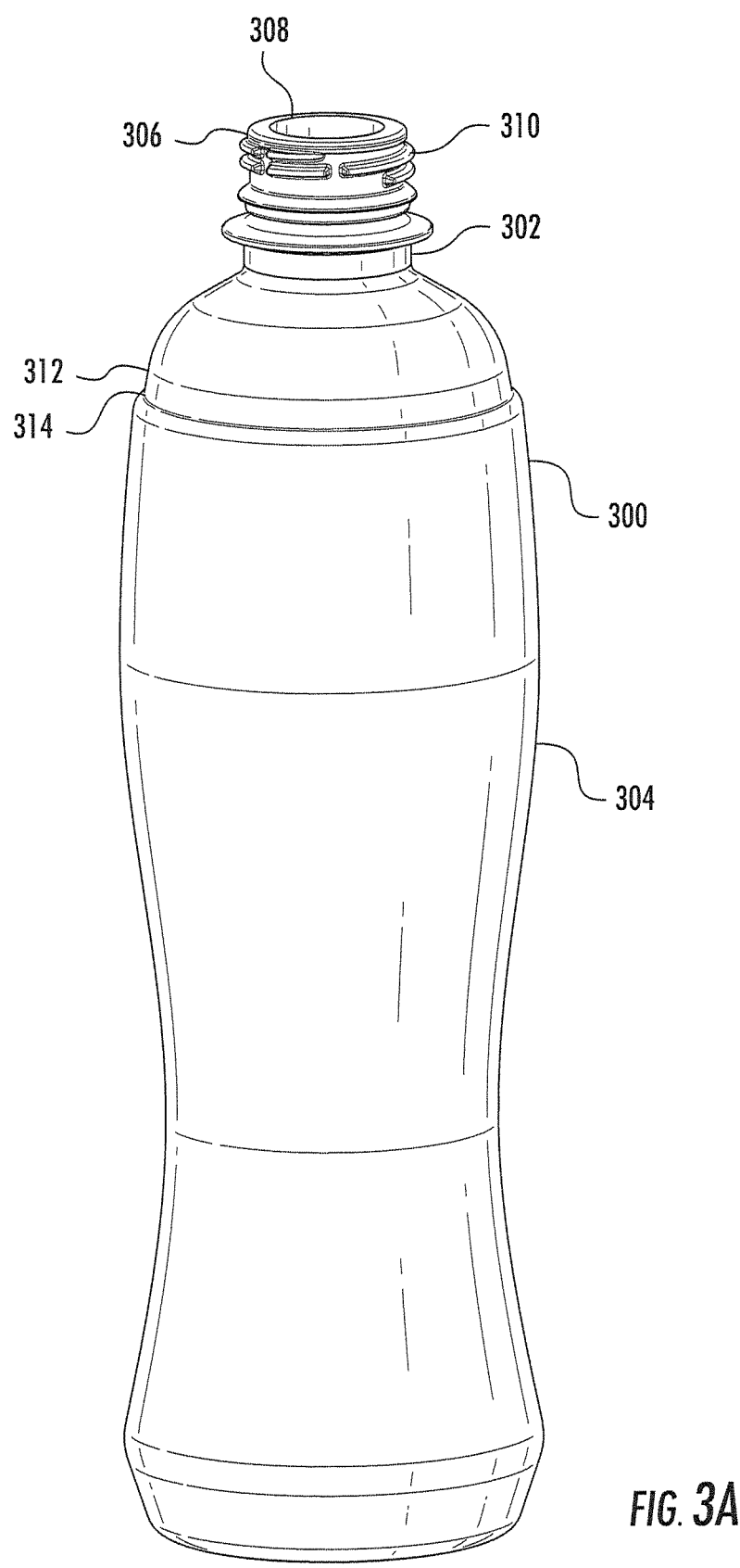
FIG. 3A is an isometric view of a container according to aspects of the disclosure.
Figure 3B:
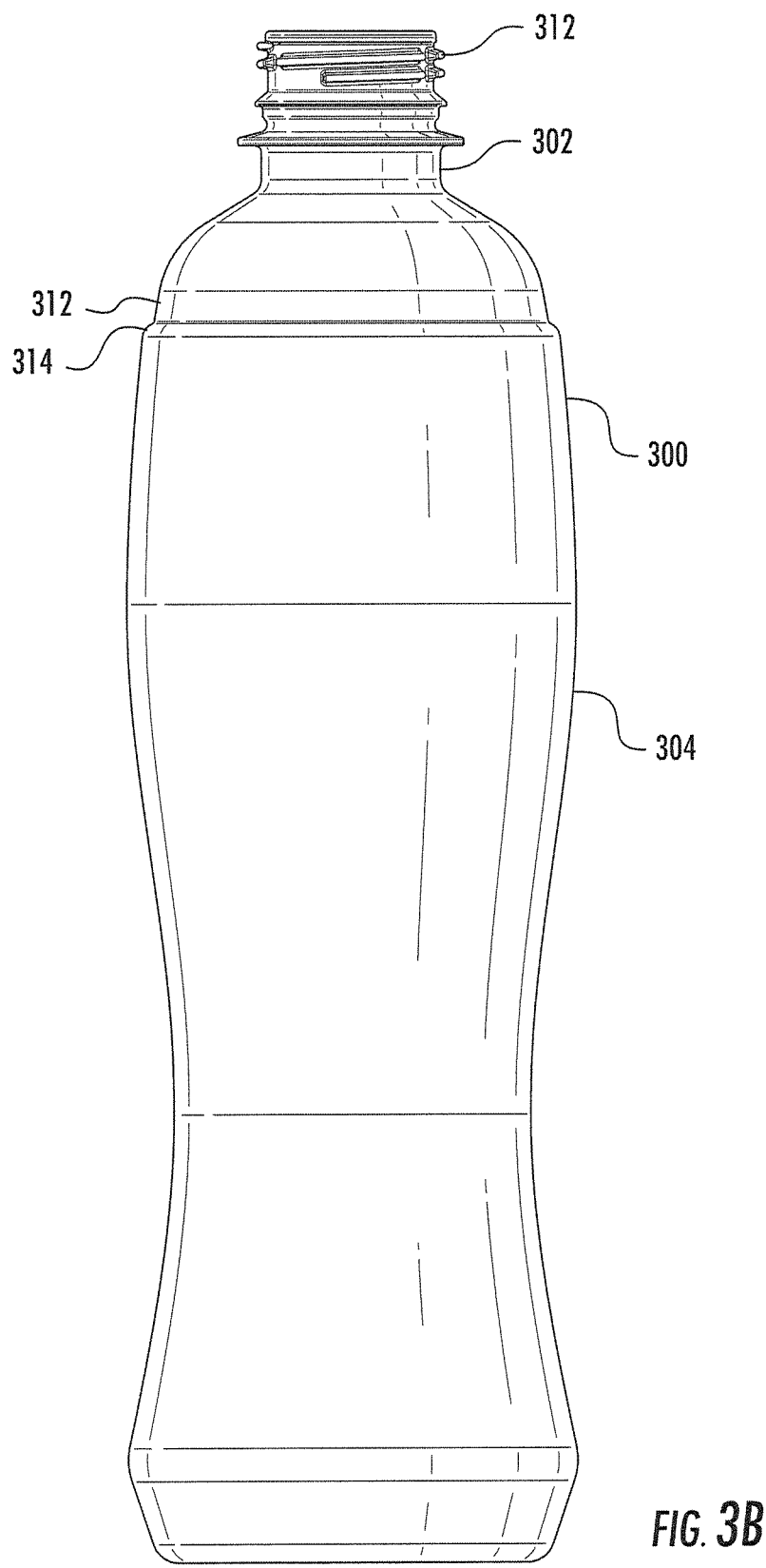
FIG. 3B is a front view of the container of FIG. 3A.
Figure 4A:
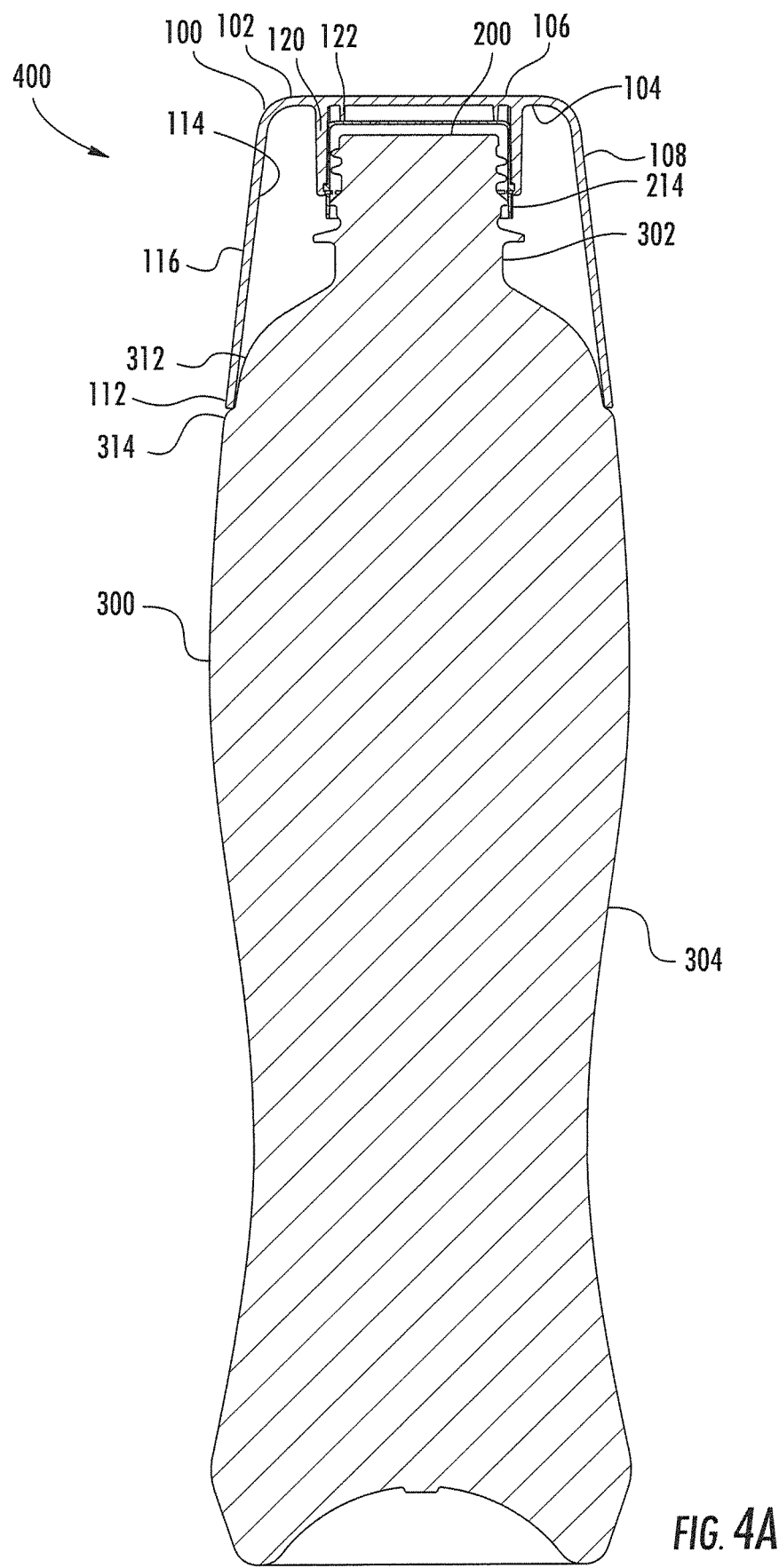
FIG. 4A is a front cross-sectional view of a container, cap, and over-cap device according to aspects of this disclosure.
Figure 4B:
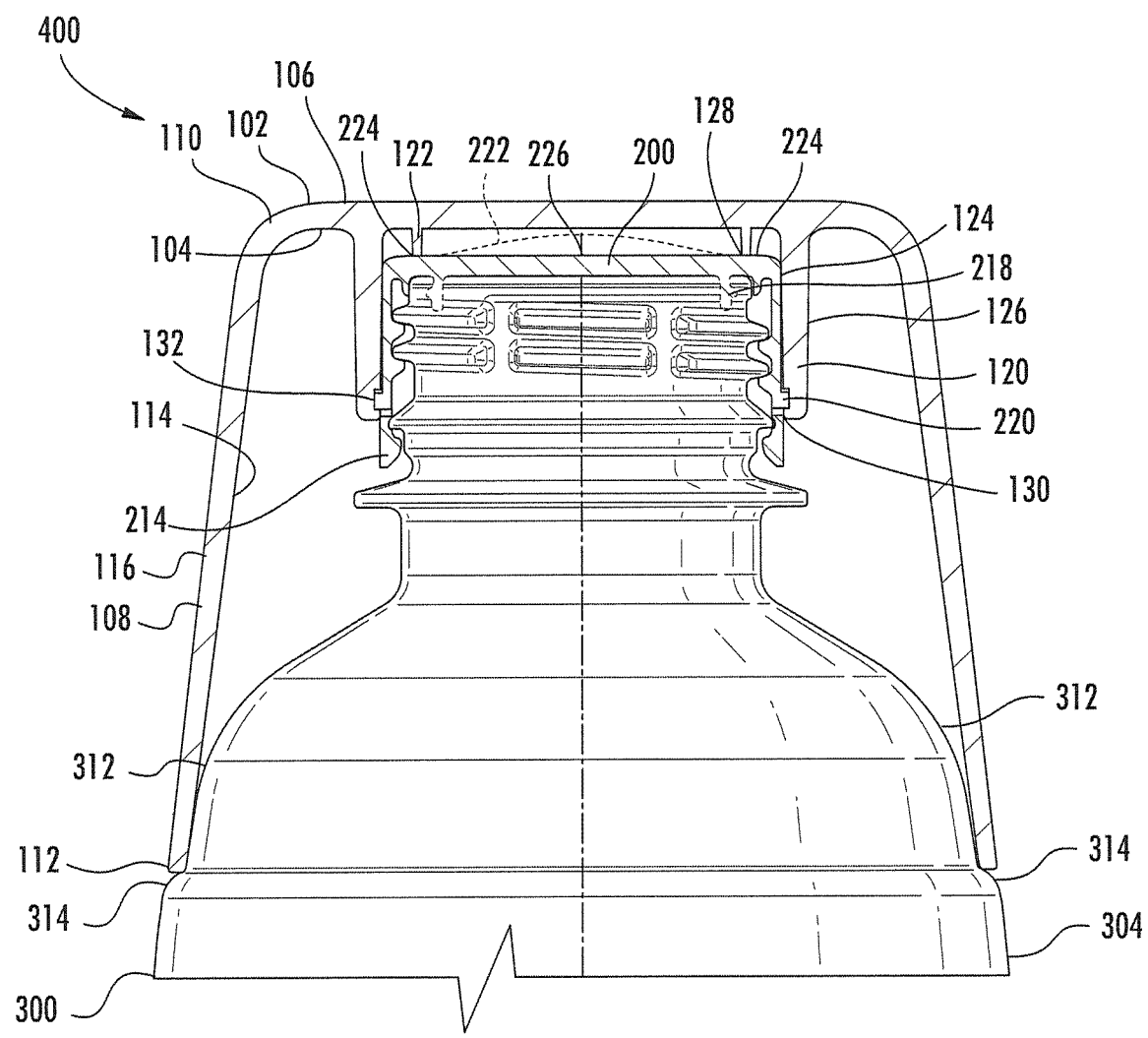
FIG. 4B is a partial cross-sectional view of portions of a container, cap, and over-cap device according to aspects of this disclosure.

FIGS. 1A and 1B illustrate an over-cap device 100 according to aspects of the disclosure. FIGS. 2A and 2B illustrate a cap 200 according to aspects of the disclosure. The over-cap device 100 may be engaged with a cap 200. FIGS. 3A and 3B illustrate a container 300 according to aspects of the disclosure. The container 300 may be engaged with the cap 200. FIGS. 4A and 4B illustrate various views of a container and closure system 400 including an over-cap device 100, a cap 200, and a container 300 according to aspects of the disclosure.

Referring to FIGS. 1A and 1B, the over-cap device may have top wall 102 at a top portion of the over-cap device 100. The top wall 102 may be generally circular as shown in FIGS. 1A and 1B and may have an inner surface 104 and an outer surface 106. However, in other embodiments the top wall 102 may have other shapes, including, for example, oval, square, octagonal, hexagonal, etc. The top wall 102 may be connected at its perimeter to an outer wall 108 that generally extends downward from the top wall 102. The outer wall 108 may include an upper portion 110 connected to the top wall 102, a lower portion 112, an inner surface 114 and an outer surface 116. The outer wall 108 may generally form a ring shape. In some embodiments, the outer wall may taper such that it has a larger circumference at the lower portion 112 than at the upper portion 110. In other examples, however, the circumference of the outer wall 108 may be smaller at the lower portion 112 than at the upper portion 110 or the circumference may be substantially similar at the upper and lower portions 110, 112.

The over-cap device 100 may also include a cap engagement wall 120 and a spacing wall 122 on an inside portion of the over-cap device 100. The cap engagement wall 120 is concentrically positioned inward of the outer wall 108 and the spacing wall 122 is concentrically positioned inward of the cap engagement wall 120.

As shown in FIG. 1B and cross-sectionally in FIGS. 4A-4B, the cap engagement wall 120 extends downward from the inner surface 104 of the top wall 102. The cap engagement wall 120 has an inner surface 124 and an outer surface 126. Alternatively, in other embodiments, the cap engagement wall 120 may be integral with the outer wall 108 or may extend to the outer wall 108 such that the inner surface 114 of the outer wall 108 and the outer surface 126 of the cap engagement wall 120 are eliminated. As shown in FIG. 1B, the cap engagement wall 120 may be a continuous wall, but in other embodiments, the cap engagement wall 120 may comprise a plurality of wall portions. As will be discussed in greater detail below, the inner surface 124 of the cap engagement wall 120 is configured to engage the cap 200.

The spacing wall 122, as shown in FIG. 1B may be a continuous annular wall extending downward from the inner surface 104 of the top wall 102. In other embodiments the spacing wall 122 may comprise a plurality of wall portions extending downward from the inner surface 104 of the top wall 102. In still other embodiments, the spacing wall 122 may comprise a series of pegs or other similar devices. As will be discussed in greater detail below the spacing wall 122 may have a lower end 128 that engages the cap 200 when the cap 200 is engaged with the over-cap device 100. As will be discussed in more detail below, the spacing wall 122 may advantageously be configured to engage an outer perimeter of the cap 200 and space the inner surface 104 of the top wall 102 a distance from the cap 200. This may provide room for the central portion of the cap 200 to bulge. The spacing wall 122 may have a height between the lower end 128 and the inner surface 104 of the top wall 102 of about 2.5 mm or in the range of about 1.5 mm to about 3.5 mm.

The over-cap device 100 may be made of any suitable material including for example plastics such as polyethylene. The over-cap device 100 can be manufactured using any suitable method include for example injection molding.

Referring now to FIGS. 2A and 2B, the cap 200 may include a top wall 202 and an annular wall 204 extending downward from the perimeter of the top wall 202. The annular wall 204 of the cap 200 may have an inner surface 206 having threads 208 which may be configured to engage the container 300. The annular wall 204 of the cap 200 may also include an outer surface 210 which may be configured to engage the inner surface 124 of the cap engagement wall 120. The annular wall 204 of the cap 200 may also have a lower end 212 which may be may be operatively attached to a tamper-evident band 214. As shown in FIGS. 4A and 4B, the cap 200 may also include an internal annular wall 218, which may aid in preventing fluid from escaping from the container 300. In some embodiments, the cap 200 may also include one or more gaskets which may further aid in preventing fluid form escaping from the container 300.

As discussed above, the over-cap device 100 and the cap 200 may be engaged together. In some embodiments, the over-cap device 100 and the cap 200 may be engaged together through press fitting or snap fit mechanisms. As shown primarily in FIGS. 4A and 4B, the over-cap device 100 and the cap 200 include complementary snap fit mechanisms. As shown in FIGS. 4A and 4B, the inner surface 124 of the cap engagement wall 120 may include a raised ring 130. When the over-cap device 100 and the cap 200 are pressed together the raised ring 130 may pass below the lower end 212 of the cap 200, locking the cap 200 and over-cap 100 together. In still other examples, and as shown in FIGS. 4A and 4B, the cap 200 may also include raised ring 220 which may be configured to engage an indented ring 132 on the inner surface 124 of the cap engagement wall 120. In some embodiments the distance between the lower end 212 of the cap 200 and the outer surface of the top wall 202 of the cap 200 may be substantially similar to the distance between the lower edge 128 of the spacing wall 122 of the over-cap device 100 and the raised ring 130 over the over-cap device 100. In some embodiments, the over-cap device 100 and the cap 200 may be non-releasably engaged such that once the over-cap device 100 and the cap 200 are engaged they may not be disengaged without destroying or bending the over-cap device 100 and/or the cap 200.

The over-cap device 100 and/or the cap 200 may also be rotationally locked together such that rotation of the over-cap device 100 will also rotate the cap 200. As shown FIG. 1B the inner surface 124 of the cap engagement wall 120 may include a series of ridges 134. Similarly, the outer surface 210 of the annular wall 204 of the cap 200 may also include ridges 216. When the over-cap device 100 and the cap 200 are engaged together the corresponding ridges 134, 216 may act to rotationally lock the over-cap device 100 and the cap 200 together. In other embodiments, other devices and/or surface treatments may be used to rotational lock the cap 200 and the over-cap 100 together.

The cap 200 may be made of any suitable material including for example plastics such as polyethylene. Additionally, the cap 200 can be manufactured using any suitable method include for example injection molding.

Referring now to FIGS. 3A and 3B which illustrate a container 300. The container 300 may define a neck 302, and a container body 304. The neck 302 may further define a top end 306 forming an opening 308. The container neck 302 may include threads 310 that may start at the top end 306 and extend down the container neck 302 any desired distance. The threads 310 of the container neck 302 are configured to engage the threads 208 of the cap 200 such that the cap 200 (including the over-cap device 100) may be rotatably removably engaged with the container 300.

The outer wall 108 of the over-cap device 100 may be configured to abut the body 304 of the container when the cap 200 (including the over-cap device 100) is engaged with the container 300. In some embodiments, and as shown in FIGS. 4A and 4B, the container body 304 may have a recessed or tapered portion 312 that may extend annularly around the container 300 and may create a ridge 314. When the cap 200 (including the over-cap device 100) is engaged with the container 300, the lower portion 112 of the outer wall 108 may abut the ridge 314 adjacent the recessed or tapered portion 312. This may create a substantially smooth transition between the outer surface 116 of the outer wall 108 and the container body 300, such that the over-cap device 100 does not extend substantially beyond the container body 304.

It is contemplated that the outer surface 116 of the outer wall 102 of the over-cap device 100 may define any suitable configuration that facilitates the removal of the cap 200 (including the over-cap device 100) from the container 300. For example, the outer surface 116 may be smooth, as illustrated in FIGS. 1A and 1B. Alternatively, outer surface 116 of the outer wall 102 may be textured. For example, the outer surface 116 of the outer wall 102 may define a plurality of ridges, or gripping elements to facilitate the removal of the cap 200 (including the over-cap device 100) from the container 300.

The container 300 may be made of any suitable material for containing a beverage, including glass or plastic.

After a beverage, such as a carbonated beverage, is placed in the container 300 and the cap 200 is engaged, the inside of the container 300 may be at a higher pressure than the outside of the container 300. This may cause portions of the container 300 and/or cap 200 to bulge. One portion that may bulge 222 is the cap 200. As discussed above, the spacing wall 122 may allow for the cap to bulge. The spacing wall 122 may engage one or more outer portions 224 of the cap 200. This may advantageously allow the center portion 226 of the cap 200 to bulge upwards such that cap 200 may not touch the inner surface 104 of the top wall 102.

The invention herein has been described and illustrated with reference to the embodiments of the figures, but it should be understood that the features of the invention are susceptible to modification, alteration, changes or substitution without departing significantly from the spirit of the invention. For example, the dimensions, number, size and shape of the various components may be altered to fit specific applications. Accordingly, the specific embodiments illustrated and described herein are for illustrative purposes only and the invention is not limited except by the following claims and their equivalents.

Further, references herein to "some embodiments," "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein.

What is claimed is:

1. A container and closure system, comprising:
   an over-cap device comprising:
      a top wall having an inner surface;
      an outer wall extending downward from the top wall;
      a cap engagement wall extending downward from the top wall; and
      a spacing wall extending downward from the inner surface of the top wall;
   a cap; and
   a container;
   wherein the over-cap device is engaged with the cap;
   wherein the spacing wall is engaged with an outer perimeter of the cap;
   wherein the spacing wall is positioned inward relative to the cap engagement wall; and
   wherein the cap is releasably engaged with the container.

2. The system of claim 1, wherein the over-cap device is non-releasably engaged with the cap.

3. The system of claim 2, wherein the over-cap device and the cap are non-releasably engaged with at least one of: press fitting, and snap fit mechanisms.

4. The system of claim 1, wherein the cap engagement wall is positioned inward and concentrically relative to the outer wall.

5. The system of claim 1, wherein the spacing wall is positioned concentrically relative to the cap engagement wall.

6. The system of claim 1, wherein the container further comprises a container body and a container neck, and wherein the outer wall engages the container body covering the neck.

7. The system of claim 6, wherein the container body includes a recessed portion, and wherein the outer wall is engaged with the recessed portion of the container body forming a substantially smooth transition between the outer wall and the container body.

8. The system of claim 1, wherein the neck defines threads on the outer surface of the neck and wherein the cap defines corresponding threads on an inner surface of the cap.

9. The system of claim 1, wherein the top wall defines a substantially planar outer surface.

10. The system of claim 1, wherein the over-cap device and the cap are not of unitary construction.

11. The system of claim 1, wherein the outer wall is annular.

12. The system of claim 1, wherein the cap engagement wall is annular.

13. The system of claim 1, wherein the cap engagement wall comprises a plurality of wall portions.

14. The system of claim 1, wherein the spacing wall is annular.

15. The system of claim 1, wherein the spacing wall comprises a plurality of wall portions.

16. An over-cap device comprising:
a top wall having an inner surface;
an outer wall extending downward from the top wall;
a cap engagement wall extending downward from an inner surface of the top wall, the cap engagement wall being positioned inward and concentrically relative to the outer wall;
a spacing wall extending downward from the inner surface of the top wall, the spacing wall being positioned inward and concentrically relative to the cap engagement wall;
wherein the over-cap device is configured to non-releasably engage a container cap with at least one of: press fitting, and snap fit mechanisms.

17. The over-cap device of claim 16, wherein the cap engagement wall comprises a plurality of wall portions.

18. The over-cap device of claim 16, wherein the spacing wall is annular.

19. The over-cap device of claim 16, wherein the spacing wall comprises a plurality of wall portions.

20. The over-cap device of claim 16, wherein the cap engagement wall and the outer wall separately extend from the inner surface.

21. A container and closure system, comprising:
an over-cap device comprising:
a top wall having an inner surface;
an outer wall extending downward from the top wall;
a cap engagement wall extending downward from an inner surface of the top wall, the cap engagement wall being positioned inward and concentrically relative to the outer wall;
a spacing wall extending downward from the inner surface of the top wall, the spacing wall being positioned inward and concentrically relative to the cap engagement wall;
a cap; and
a container comprising a container body and a container neck, wherein the outer wall engages the container body covering the neck;
wherein the over-cap device is non-releasably engaged with the cap and wherein the cap is releasably engaged with container;
wherein the container body includes a recessed portion, and wherein the outer wall is engaged with the recessed portion of the container body forming a substantially smooth transition between the outer wall and the container body;
wherein the neck defines threads on the outer surface of the neck and wherein the cap defines corresponding threads on an inner surface of the cap;
wherein the over-cap device and the cap are non-releasably engaged with at least one of: press fitting, and snap fit mechanisms; and
wherein the over-cap device and the cap are not of unitary construction.

22. The system of claim 21, wherein the cap includes an internal annular wall.

* * * * *